United States Patent
Hayashi

(10) Patent No.: US 11,275,575 B2
(45) Date of Patent: Mar. 15, 2022

(54) INFORMATION PROCESSING APPARATUS, METHOD, AND RECORDING MEDIUM

(71) Applicant: Yusuke Hayashi, Tokyo (JP)

(72) Inventor: Yusuke Hayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/903,493

(22) Filed: Jun. 17, 2020

(65) Prior Publication Data

US 2020/0401393 A1    Dec. 24, 2020

(30) Foreign Application Priority Data

Jun. 18, 2019    (JP) .............................. JP2019-112996

(51) Int. Cl.
     *G06F 8/65*      (2018.01)
     *G06F 8/61*      (2018.01)

(52) U.S. Cl.
     CPC . *G06F 8/65* (2013.01); *G06F 8/61* (2013.01)

(58) Field of Classification Search
     USPC ........................................................ 717/168
     See application file for complete search history.

(56) References Cited

U.S. PATENT DOCUMENTS

| | | | | |
|---|---|---|---|---|
| 8,705,082 B2* | 4/2014 | Nakamoto | ......... | H04N 1/32609 |
| | | | | 358/1.15 |
| 9,489,191 B2* | 11/2016 | Ukai | ................. | H04M 1/72406 |
| 10,438,021 B2 | 10/2019 | Hayashi | | |
| 10,545,768 B2 | 1/2020 | Hayashi | | |
| 10,582,080 B2* | 3/2020 | Yu | ....................... | H04N 1/00244 |
| 2006/0232816 A1* | 10/2006 | Konno | ............... | H04N 1/00925 |
| | | | | 358/1.15 |
| 2014/0029049 A1* | 1/2014 | Takahashi | ............... | G06F 9/451 |
| | | | | 358/1.15 |
| 2016/0182610 A1 | 6/2016 | Satoh | | |
| 2016/0188310 A1* | 6/2016 | Hayami | ..................... | G06F 8/61 |
| | | | | 717/174 |
| 2017/0024202 A1* | 1/2017 | Tokuda | ..................... | G06F 8/65 |
| 2017/0180387 A1 | 6/2017 | Hayashi et al. | | |
| 2018/0181388 A1* | 6/2018 | Takahashi | ............. | G06F 3/1285 |
| 2018/0349065 A1 | 12/2018 | Hayashi | | |
| 2020/0036774 A1* | 1/2020 | Tada | ...................... | H04L 67/26 |
| 2020/0150947 A1 | 5/2020 | Hayashi | | |

FOREIGN PATENT DOCUMENTS

JP      2016-115285      6/2016

* cited by examiner

*Primary Examiner* — Wei Y Zhen
*Assistant Examiner* — Clint Thatcher
(74) *Attorney, Agent, or Firm* — IPUSA, PLLC

(57) ABSTRACT

An information processing apparatus includes a main unit including a first installer; an operation unit including a second installer; processing circuitry; and a memory storing computer-executable instructions that cause the processing circuitry to cause the second installer of the operation unit to acquire an application type of an application to be updated and to update the application based on the acquired application type.

4 Claims, 11 Drawing Sheets

INFORMATION PROCESSING APPARATUS, METHOD, AND RECORDING MEDIUM

CROSS-REFERENCE TO RELATED APPLICATION

The present application is based on and claims priority under 35 U.S.C. § 119 to Japanese Patent Application No. 2019-112996, filed on Jun. 18, 2019, the contents of which are incorporated herein by reference in their entirety.

BACKGROUND OF THE INVENTION

1. Field of the Invention

The present invention relates to an information processing apparatus, a method, and a recording medium.

2. Description of the Related Art

In the related art, the spread of various communication devices, such as smartphones and tablet terminals, has led to active developments of applications that can be used in communication devices. In order to promote the use of these applications, websites and applications (hereafter also referred to as application sites), which are capable of introducing an application, directly download an application to a communication device, and install and update the downloaded application, have been developed.

For example, Patent Document 1 discloses a technique for determining whether an application, which is requested to be used in a multifunction peripheral (MFP), can be used, in consideration of the connection state of a peripheral device to the MFP (paragraph 72 of Patent Document 1).

Patent Document 1: Japanese Unexamined Patent Application Publication No. 2016-115285

SUMMARY OF THE INVENTION

According to one aspect of the present invention, there is provided an information processing apparatus including a main unit including a first installer; an operation unit including a second installer; processing circuitry; and a memory storing computer-executable instructions that cause the processing circuitry to cause the second installer of the operation unit to acquire an application type of an application to be updated and to update the application based on the acquired application type.

DETAILED DESCRIPTION OF THE PREFERRED EMBODIMENTS

Figure 1:
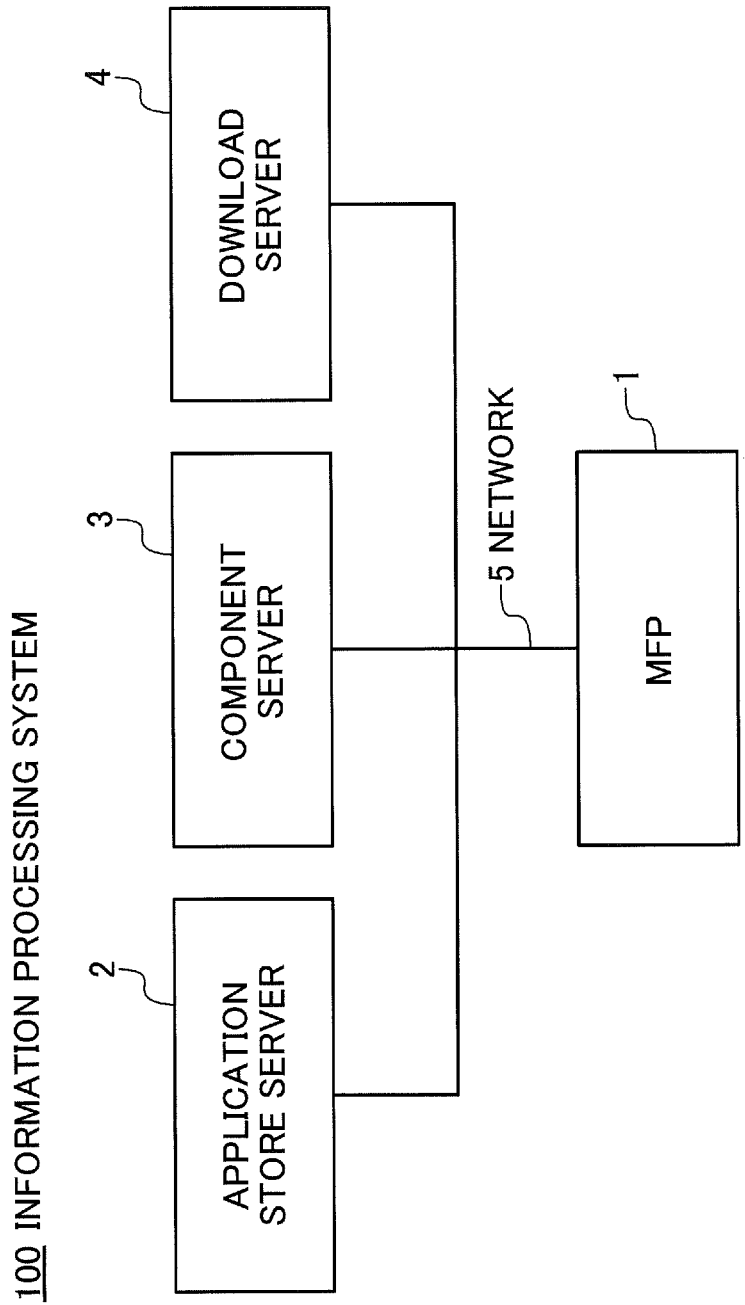
FIG. 1 is a diagram illustrating an example of an overall configuration of an information system according to an embodiment of the present invention.

In the technique disclosed in the above-described Patent Document 1, there has been the following problem. That is, there is an application (hereinafter, also referred to as a hybrid application (an example of a cooperative application)), in which an application in the main unit of an image forming apparatus such as an MFP and an application in the operation unit of the image forming apparatus operate in cooperation with each other. When such an application (hybrid application) is installed from a location other than an application site, it is not possible to update the hybrid application from the application site.

A problem to be addressed by an embodiment of the present invention is to update, from an application site, a hybrid application that has been installed from a location other than the application site.

Hereinafter, each embodiment will be described with reference to the accompanying drawings. In the present specification and the drawings, the elements having substantially the same functional configurations are denoted by the same reference numerals and overlapping descriptions may be omitted.

System Configuration

FIG. 1 is a diagram illustrating an example of the overall configuration of an information processing system 100 according to the present exemplary embodiment. As illustrated in FIG. 1, the information processing system 100 includes one or more multifunction peripherals (MFPs) 1, an application store server 2, a component server 3, and a download server 4. The MFP 1, the application store server 2, the component server 3, and the download server 4 are communicatively connected to each other via a network 5.

Figure 4:
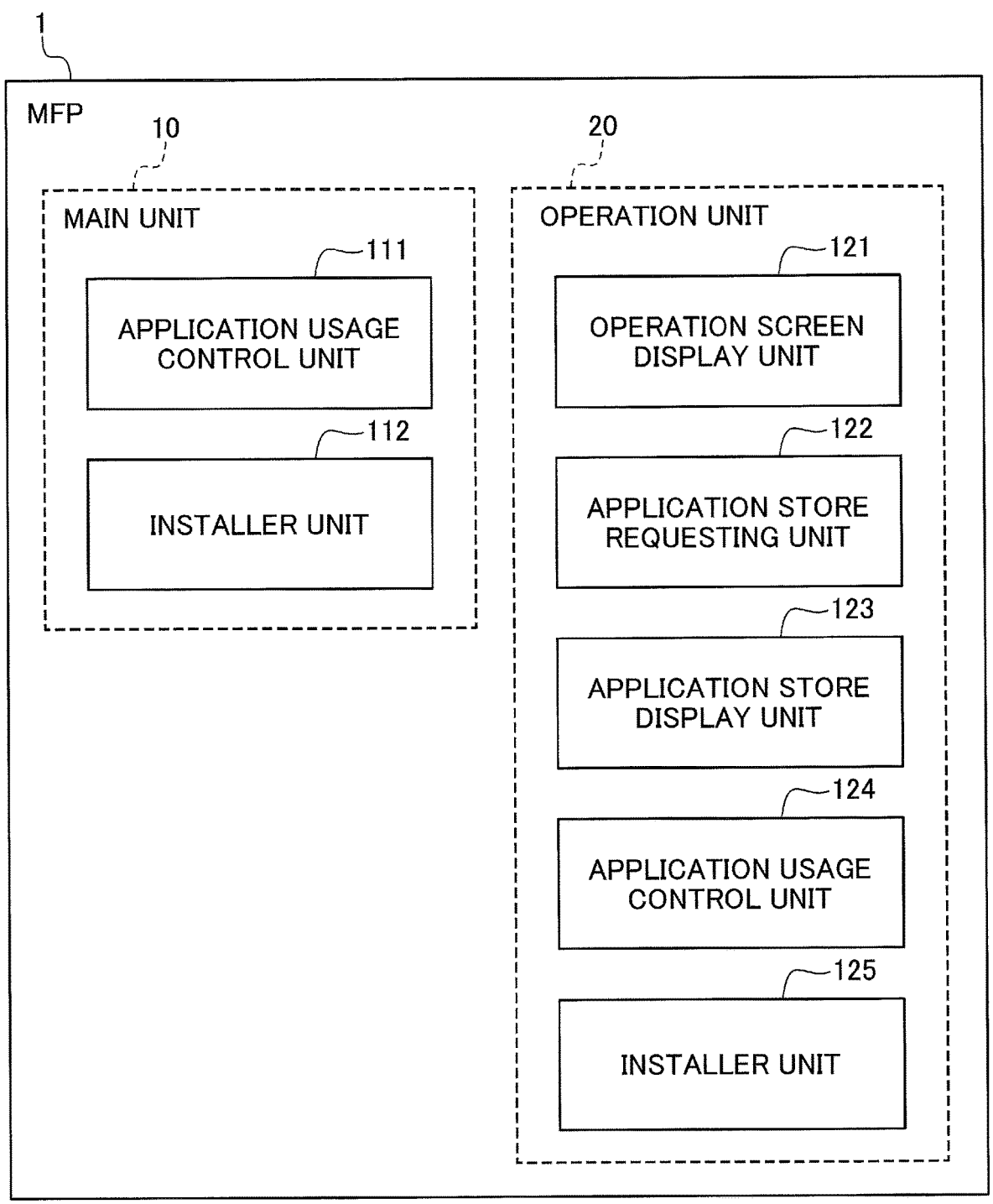
FIG. 4 is a block diagram illustrating an example of a functional configuration of the MFP according to an embodiment of the present invention.

The MFP 1 (Multifunction Peripheral/Printer/Product) is an example of an information processing apparatus. The MFP 1 is capable of expanding functions at any time by adding or updating applications. Referring later to FIG. 4, the MFP 1 will be described in detail.

The information processing apparatus is not limited to an image forming apparatus such as the MFP 1, as long as the apparatus has a communication function. The information processing apparatus may be, for example, a Projector (PJ), an Interactive White Board (IWB; a white board having an electronic blackboard function capable of mutual communication), an output device such as a digital signage, a Head Up Display (HUD) device, an industrial machine, an imaging device, a sound collector, a medical device, a network home appliance, an automobile (Connected Car), a notebook Personal Computer (PC), a mobile phone, a smartphone, a tablet terminal, a game machine, a Personal Digital Assistant (PDA), a digital camera, a wearable PC, a desktop PC, or the like.

The application store server 2 displays a list of one or more applications, and provides, to the MFP 1, a web page for making a usage contract of each application or for downloading each application, that is, a web page (may be referred to as an "application store" in the following description) for providing an application to the MFP 1. Details will be described later. In this example, an application for acquiring an application store from the application store server 2 and displaying the application store to the MFP 1 (may be referred to as a "store startup application" in the following description) and an application (hereinafter, may be referred to as an "installation/update application") that provides functions for controlling the use of an application selected by a user among the applications displayed on the application store (for example, control for downloading an application to the MFP 1 and installing/updating the downloaded application), are installed in the MFP 1 in advance. In this example, the functions of the store startup application and the installation/update application are implemented by using an application for providing the web browser functions (hereinafter, may be referred to as "browser application"). In this example, the browser application is also installed in the MFP 1 in advance.

The component server 3 reports, to the MFP 1, the application type (information of whether the application is a hybrid application or not a hybrid application (hereinafter referred to as a "native application")) of the application for which use in the MFP 1 is requested (for example, the application for which installation or update is requested). Details will be described later.

The download server 4 provides an application in response to a request from the MFP 1. In this example, the download server 4 holds the applications displayed on the application list screen, but the type of application that the download server 4 holds (manages) is not limited thereto.

Note that each of the servers (the application store server 2, the component server 3, and the download server 4) may be implemented by one or more computers. In FIG. 1, the servers (the application store server 2, the component server 3, and the download server 4) are described as separate devices, but at least two of the servers (the application store server 2, the component server 3, and the download server 4) may be implemented by one computer.

Hardware Configuration

Figure 2:
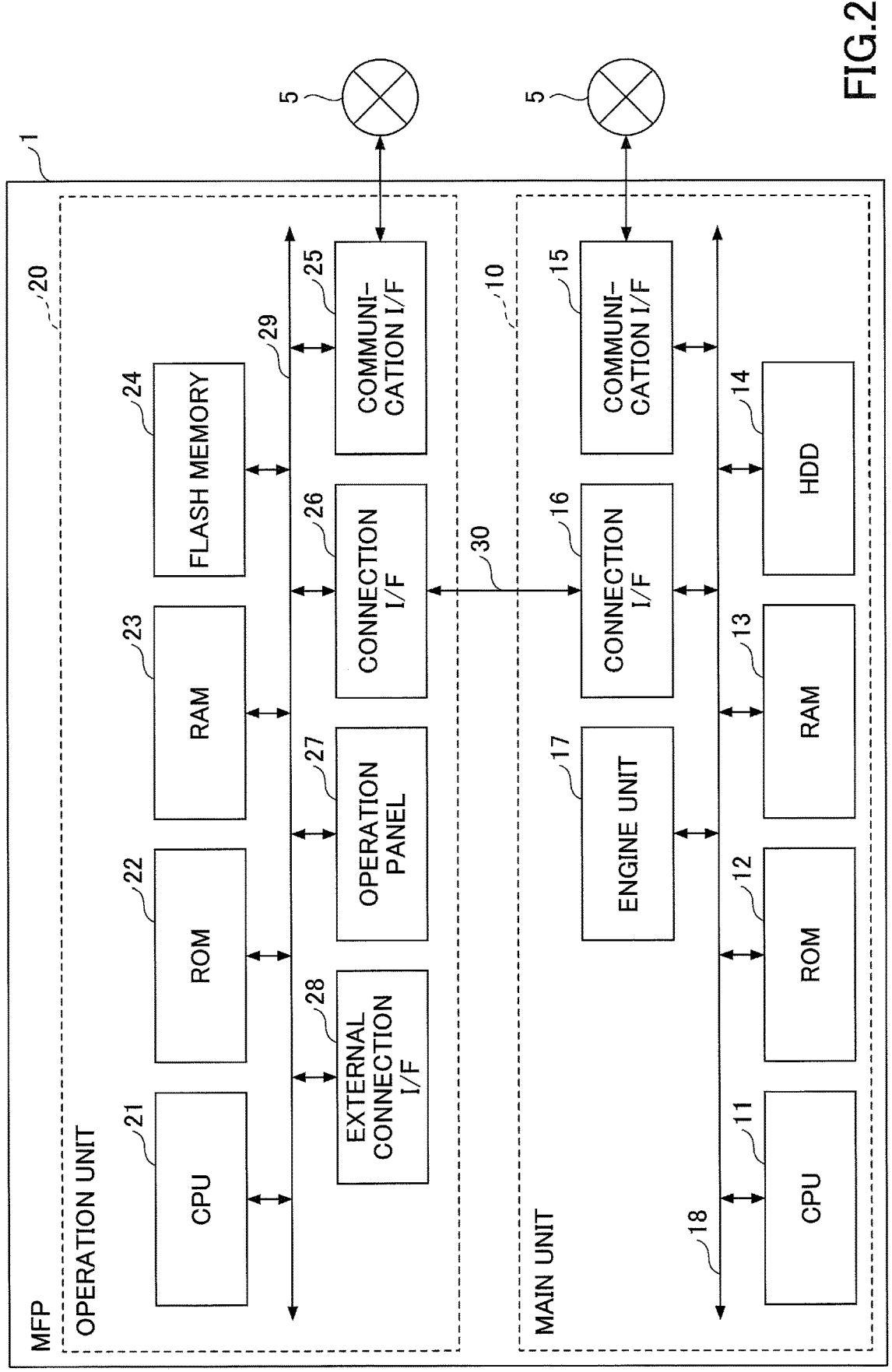
FIG. 2 is a diagram illustrating an example of a hardware configuration of a multifunction peripheral (MFP) according to an embodiment of the present invention.

FIG. 2 is a diagram illustrating an example of a hardware configuration of an the MFP 1. As illustrated in FIG. 2, the MFP 1 includes a main unit 10 capable of implementing various functions, such as a copy function, a scanner function, a fax function, a printer function and the like, and an operation unit 20 for accepting an operation by a user. The concept of accepting an operation of the user includes accepting information (including a signal representing the coordinate value of the screen) input in accordance with the operation of the user. The main unit 10 and the operation unit 20 are connected to each other in a communicable manner via an exclusive-use communication channel 30. The communication channel 30 may be, for example, a communication channel of the Universal Serial Bus (USB) standard, but may be a communication channel of any standard, regardless of being wired or wireless.

The main unit 10 is capable of performing an operation according to the operation accepted by the operation unit 20. The main unit 10 is capable of communicating with an external device, such as a client PC (personal computer), and is capable of performing an operation according to an instruction received from the external device.

First, the hardware configuration of the main unit 10 will be described. As illustrated in FIG. 2, the main unit 10 includes a central processing unit (CPU) 11, a read-only memory (ROM) 12, a random access memory (RAM) 13, a hard disk drive (HDD) 14, a communication interface (I/F) 15, a connection I/F 16, and an engine unit 17, which are connected to each other via a system bus 18.

The CPU 11 comprehensively controls the operations of the main unit 10. The CPU 11 executes a program stored in the ROM 12 or the HDD 14 by using the RAM 13 as the work area to control the operations of the entire main unit 10, thereby implementing various functions such as a copy function, a scanner function, a fax function, and a printer function as described above.

The communication I/F 15 is an interface for connecting to the network 5. The connection I/F 16 is an interface for communicating with the operation unit 20 via the communication channel 30.

The engine unit 17 is a hardware element that performs general-purpose information processing and processing other than communication in order to implement the copy function, the scanner function, the fax function, and the printer function. For example, a scanner (image reading unit) for scanning and reading an image of an original document, a plotter (image forming unit) for printing images onto a sheet material such as a paper sheet, a fax unit for performing fax communication, and the like are provided. Further, certain options may be provided, such as a finisher for sorting printed sheet materials or an automatic document feeder (ADF) for automatically feeding the original documents.

Next, the hardware configuration of the operation unit 20 will be described. As illustrated in FIG. 2, the operation unit 20 includes a CPU 21, a ROM 22, a RAM 23, a flash memory 24, a communication I/F 25, a connection I/F 26, an operation panel 27, and an external connection I/F 28, which are connected to each other via a system bus 29.

The CPU 21 comprehensively controls the operations of the operation unit 20. The CPU 21 executes a program stored in the ROM 22 or the flash memory 24 by using the RAM 23 as the work area to control the operations of the entire operation unit 20, thereby implementing various functions described below, such as the display of information (image) according to the input accepted from the user.

The communication I/F 25 is an interface for connecting to the network 5. The connection I/F 26 is an interface for communicating with the main unit 10 via the communication channel 30.

The operation panel 27 accepts various inputs according to the operation of the user and displays various kinds of information (for example, information according to the operation accepted, information indicating the operation status of the MFP 1, information indicating the setting state, etc.). In this example, the operation panel 27 is configured by, but not limited to, a liquid crystal display (LCD) having a touch panel function. For example, the operation panel 27 may be configured by an organic electroluminescent (EL) display with a touch panel function. Additionally, or alternatively, an operation unit, such as a hardware key, or a display unit, such as a lamp, may be provided.

The external connection I/F 28 is an interface for connecting to peripheral devices, for example, an image processing device such as a camera, a voice sound input/output device such as a microphone or speaker, and a hardware element such as a card reader/writer.

Software Configuration

Figure 3:
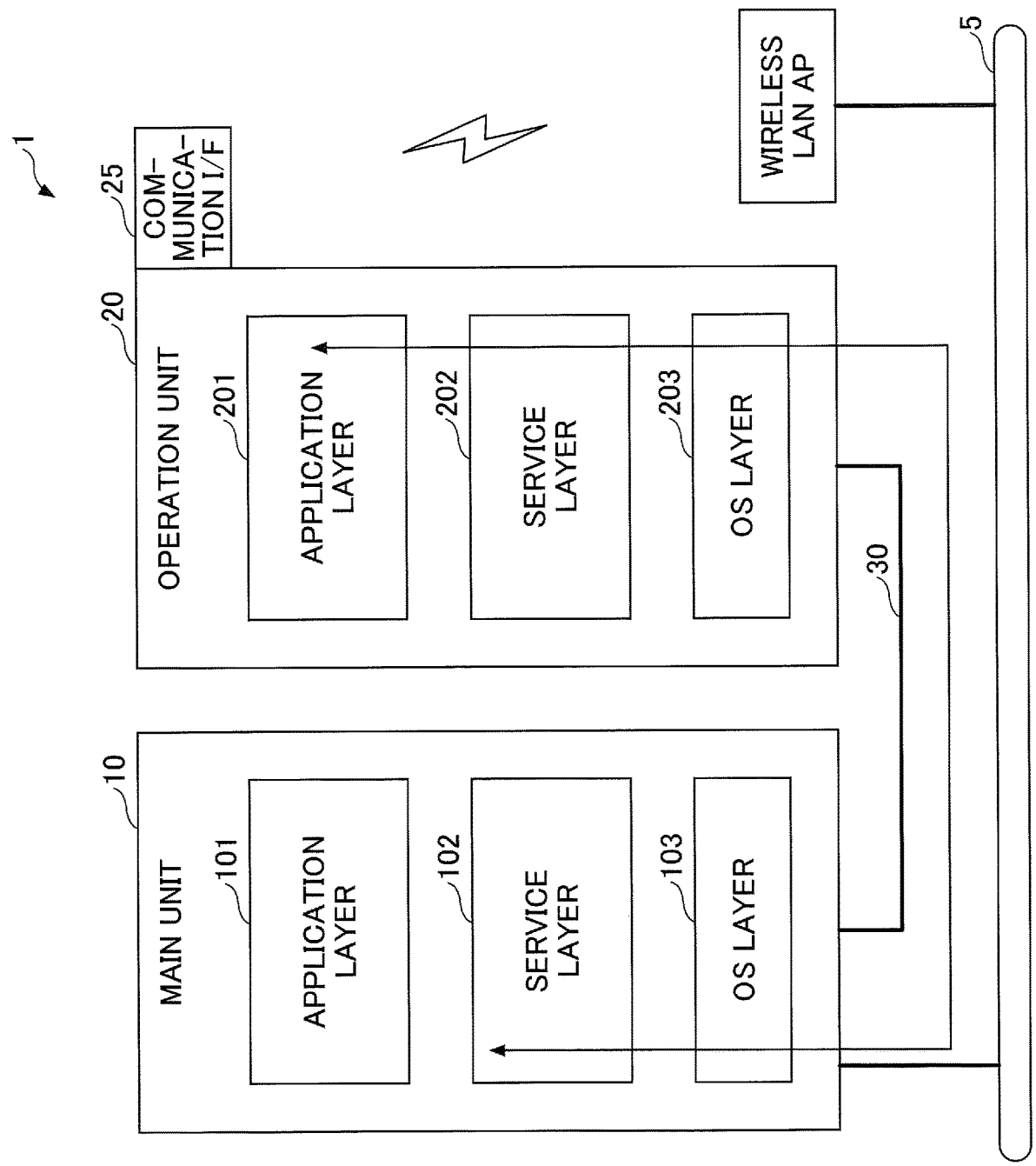
FIG. 3 illustrates an example of a software configuration of the MFP according to an embodiment of the present invention.

FIG. 3 is a diagram illustrating an example of the software configuration of the MFP 1. As illustrated in FIG. 3, the main unit 10 includes an application layer 101, a service layer 102, and an Operating System (OS) layer 103. The entities of the application layer 101, the service layer 102, and the OS layer 103 are various types of software stored in the ROM 12 or the HDD 14. The CPU 11 executes these types of software to provide various functions.

The software of the application layer 101 is application software (may be referred to simply as an "application" in the following description) for operating hardware resources to provide predetermined functions. For example, the application may be a copy application for providing a copy function, a scanner application for providing a scanner function, a facsimile application for providing a fax function, a printer application for providing a printer function, or the like.

The software of the service layer 102 is interposed between the application layer 101 and the OS layer 103 and is software for providing an interface for utilizing the hardware resources provided in the main unit 10. More specifically, the software is used to provide a function for accepting an operation request for a hardware resource and for arbitrating the operation request. The operation request accepted by the service layer 102 may be a request for reading by a scanner or printing by a plotter, etc.

The interface function according to the service layer 102 is provided not only with respect to the application layer 101 of the main unit 10 but also with respect to the application layer 201 of the operation unit 20. That is, the application layer 201 (application) of the operation unit 20 is capable of implementing a function using hardware resources (for example, the engine unit 17) of the main unit 10 via the interface function of the service layer 102.

The software of the OS layer 103 is basic software (operating system (OS)) for providing a basic function for controlling the hardware provided in the main unit 10. The software of the service layer 102 converts a request for using hardware resources from various applications into a command that can be interpreted by the OS layer 103 and transfers the command to the OS layer 103. When the command is executed by the software of the OS layer 103, the hardware resource performs an operation according to the request of the application.

Similarly, the operation unit 20 includes an application layer 201, a service layer 202, and an OS layer 203. The application layer 201, the service layer 202, and the OS layer 203 provided in the operation unit 20 are also similar to those of the main unit 10 in terms of the hierarchical structure. However, the functions provided by the applications of the application layer 201 and the types of operation requests that the service layer 202 can accept are different from those of the main unit 10. The applications of the application layer 201 may be software for operating the hardware resources provided in the operation unit 20 to provide predetermined functions; however, the applications of the application layer 201 are mainly software for providing the functions of the user interface (UI) for performing operations and display with respect to the functions (the copy function, the scanner function, the fax function, and the printer function) provided in the main unit 10. The applications of the application layer 201 include store startup applications, installation and update applications, browser applications, and the like.

In the present embodiment, the software of the OS layer 103 in the main unit 10 and the software of the OS layer 203 in the operation unit 20 are different from each other in order to maintain the functional independence. That is, the main unit 10 and the operation unit 20 operate independently of each other in separate operating systems. For example, Linux (registered trademark) may be used as the software of the OS layer 103 in the main unit 10, and Android (registered trademark) may be used as the software of the OS layer 203 in the operation unit 20.

As described above, in the MFP 1 according to the present embodiment, the main unit 10 and the operation unit 20 operate in separate operating systems. Therefore, communication between the main unit 10 and the operation unit 20 is performed not as communication between processes within a common apparatus but as communication between different apparatuses. This includes an operation of transmitting information (instructions from the user) accepted by the operation unit 20 to the main unit 10 (command communication) and an operation of the main unit 10 reporting an event to the operation unit 20. Here, by the operation unit 20 performing command communication to the main unit 10, the function of the main unit 10 can be used. The event that is reported from the main unit 10 to the operation unit 20 includes the state of executing an operation in the main unit 10 and the contents set in the main unit 10.

Further, in the above-described embodiment, the main unit 10 and the operation unit 20 operate independently of each other in separate operating systems. However, the present invention is not limited thereto. For example, the main unit 10 and the operation unit 20 may operate by the same operating system.

Function Configuration

FIG. 4 is a block diagram illustrating an example of a functional configuration of the MFP 1. As illustrated in FIG. 4, the main unit 10 of the MFP 1 includes an application usage control unit 111 and an installer unit 112. The operation unit 20 of the MFP 1 includes an operation screen display unit 121, an application store requesting unit 122, an application store display unit 123, an application usage control unit 124, and an installer unit 125. For convenience of illustration, FIG. 4 mainly illustrates the functions according to embodiments of the present invention, but the MFP 1 has functions that are not limited to those illustrated in FIG. 4.

Main Unit

Hereinafter, the main unit 10 will be described.

The application usage control unit 111 performs control for using applications in the MFP 1.

The installer unit 112 performs processes for installing or updating an application. More details will be described later.

Operation Unit

Hereinafter, the operation unit 20 will be described.

Figure 5:
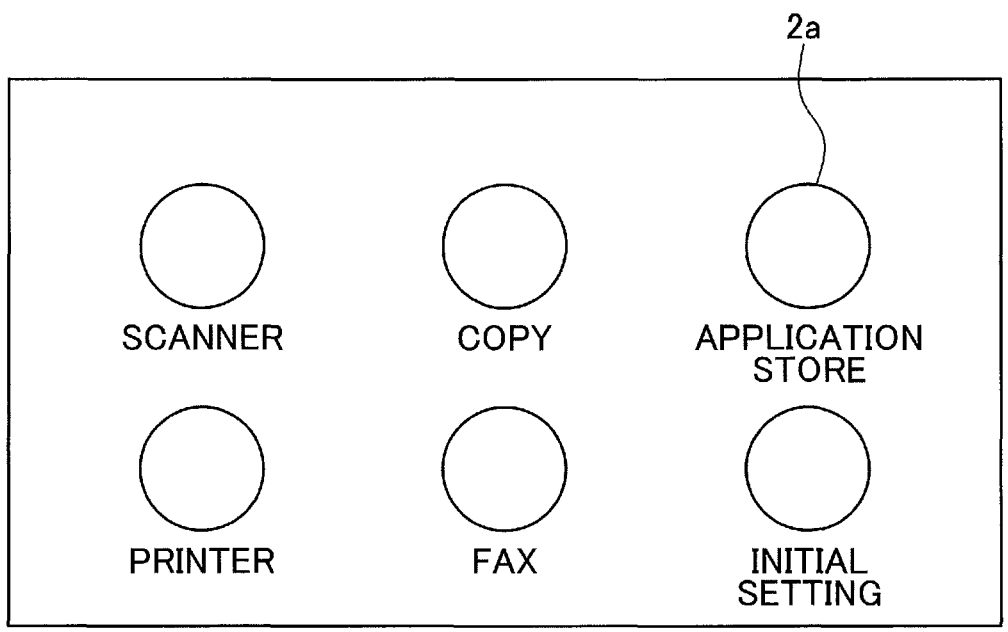
FIG. 5 illustrates an example of an operation screen according to an embodiment of the present invention.

The operation screen display unit 121 performs control for displaying the operation screen for performing various operations on the operation panel 27. FIG. 5 is a diagram illustrating an example of an operation screen, wherein an icon 2a for starting up a store startup application is displayed on the operation screen.

When the user touches the icon 2a, the store startup application starts up, and the store startup application (the application store requesting unit 122) performs control to send a request for an application store to the application store server 2. More specifically, the store startup application (the application store requesting unit 122) transmits a signal requesting the application store to the application store server 2 (may be referred to as an "application store request" in the following description).

Figure 6:
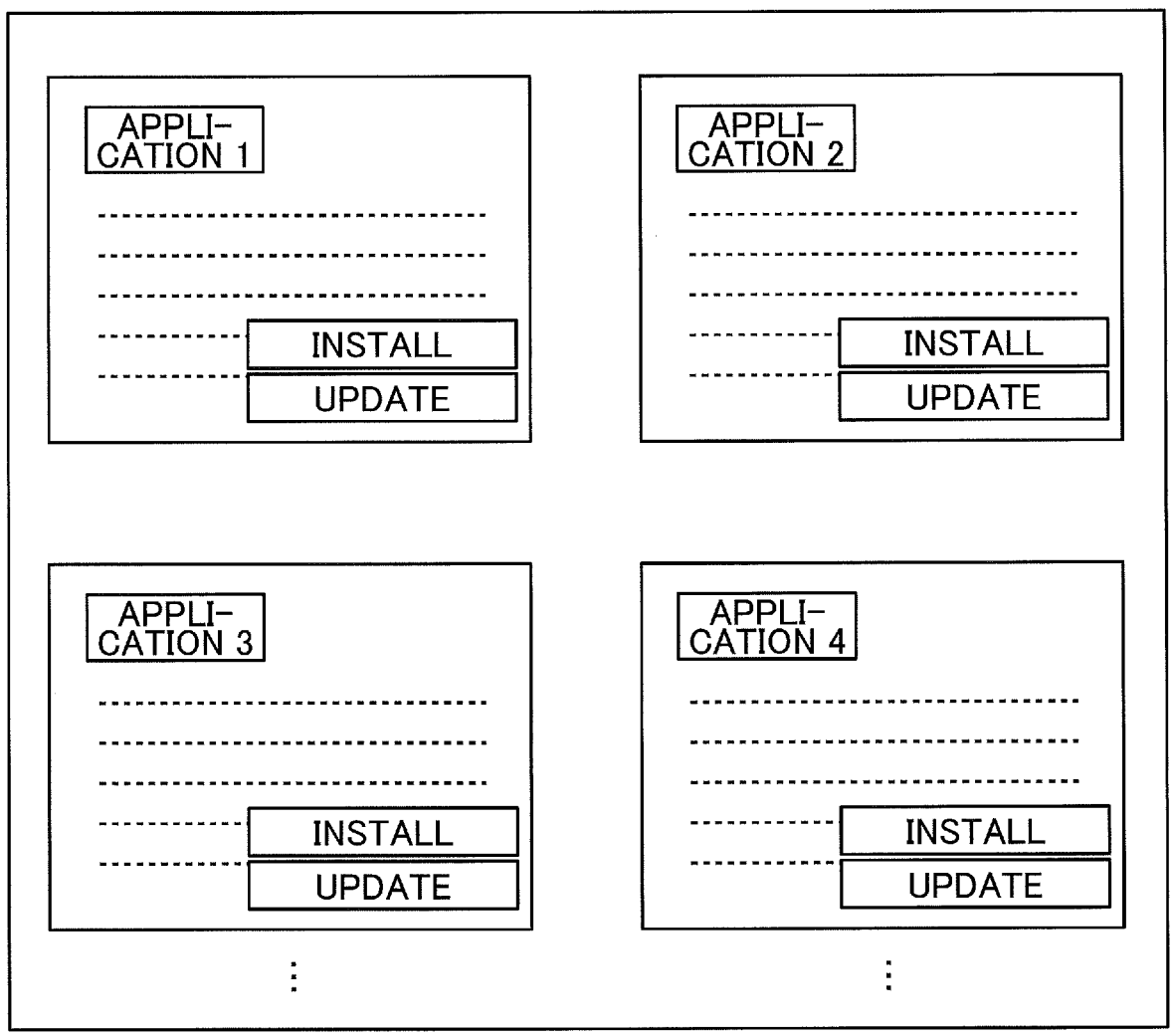
FIG. 6 illustrates an example of an application store according to an embodiment of the present invention.

The description of FIG. 4 will be continued. The application store display unit 123 performs control for displaying the application store received from the application store server 2 on the operation panel 27 in response to the application store request. FIG. 6 is a diagram illustrating an example of an application store (web page). In the example of FIG. 6, the application store displays, for each application, descriptive information describing the contents of the application and buttons for instructing to use the application (in this example, the buttons for instructing the application to be installed or updated, are hereinafter referred to as an "install button" or an "update button").

The application usage control unit 124 performs control for using the application in the MFP 1.

The installer unit 125 performs the process of installing or updating an application. More details will be described later.

Hybrid Application and Native Application

Figure 7:
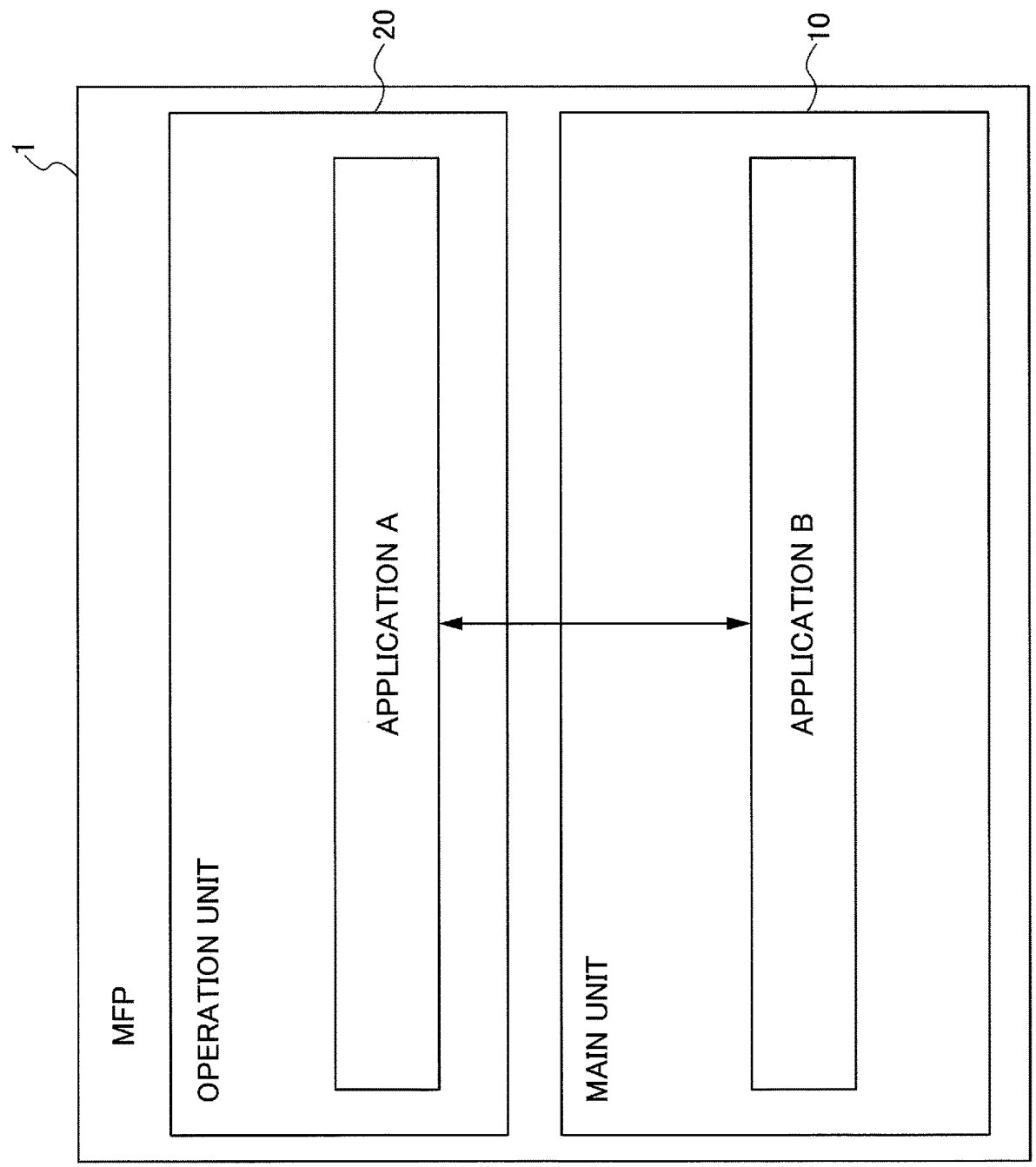
FIG. 7 is a diagram for explaining a hybrid application according to an embodiment of the present invention.

The hybrid application and native application will now be described. FIG. 7 is a diagram for describing a hybrid application.

As illustrated in FIG. 7, the hybrid application (an example of a cooperative application) is an application in which applications respectively exist in the operation unit 20 and the main unit 10 of the information processing apparatus such as the MFP 1 (in the example illustrated in FIG. 7, applications A and B), and the respective applications (that is, the application A and the application B) operate in cooperation with each other.

In the native application, an application exists in the operation unit 20 of the information processing apparatus such as an MFP (in the example of FIG. 7, application A), and this application (that is, application A) operates independently (an example of an independent application).

Therefore, in order to update a native application, only the application corresponding to the native application (application A in the example above) needs to be updated; however, in order to update a hybrid application, both applications (both application A and application B in the example above) need to be updated.

Overview of Update in the Related Art

Figure 8:
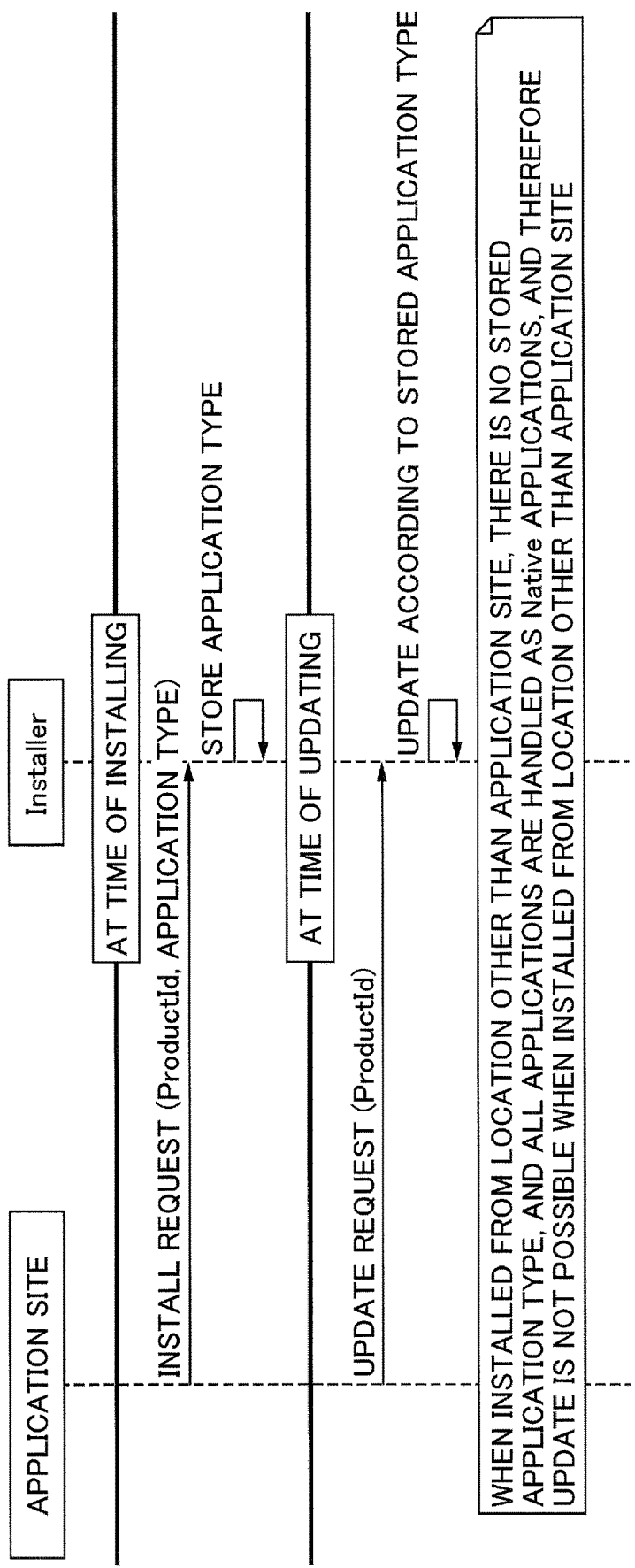
FIG. 8 is a diagram for explaining an update of the related art.

FIG. 8 is a diagram for describing an update of an application of the related art. As illustrated in FIG. 8, at the time of installation, an application site (a web site or application that is capable of downloading an application to the MFP and install or update the downloaded application) reports, to the installer of the MFP, the product ID (identifier for identifying the application) and the application type (information on whether the application is a hybrid application or a native application). Then, the MFP store's the product ID and the application type in association with each other. At the time of update (at the time of application update), the application site only reports the product ID to the installer of the MFP. The installer of the MFP performs an update process according to the application type stored at the time of installation.

In the application update of the related art, for applications installed from locations other than the application site, there is no stored application type, and, therefore, all of these applications have been handled as native applications. As a result, it has not been possible to update an application if the application had been installed from a location other than the application site (specifically, only the application in the operation unit is updated, and the application in the main unit cannot be updated, even in the case of a hybrid application).

Overview of Update in an Embodiment of the Present Invention

Figure 9:
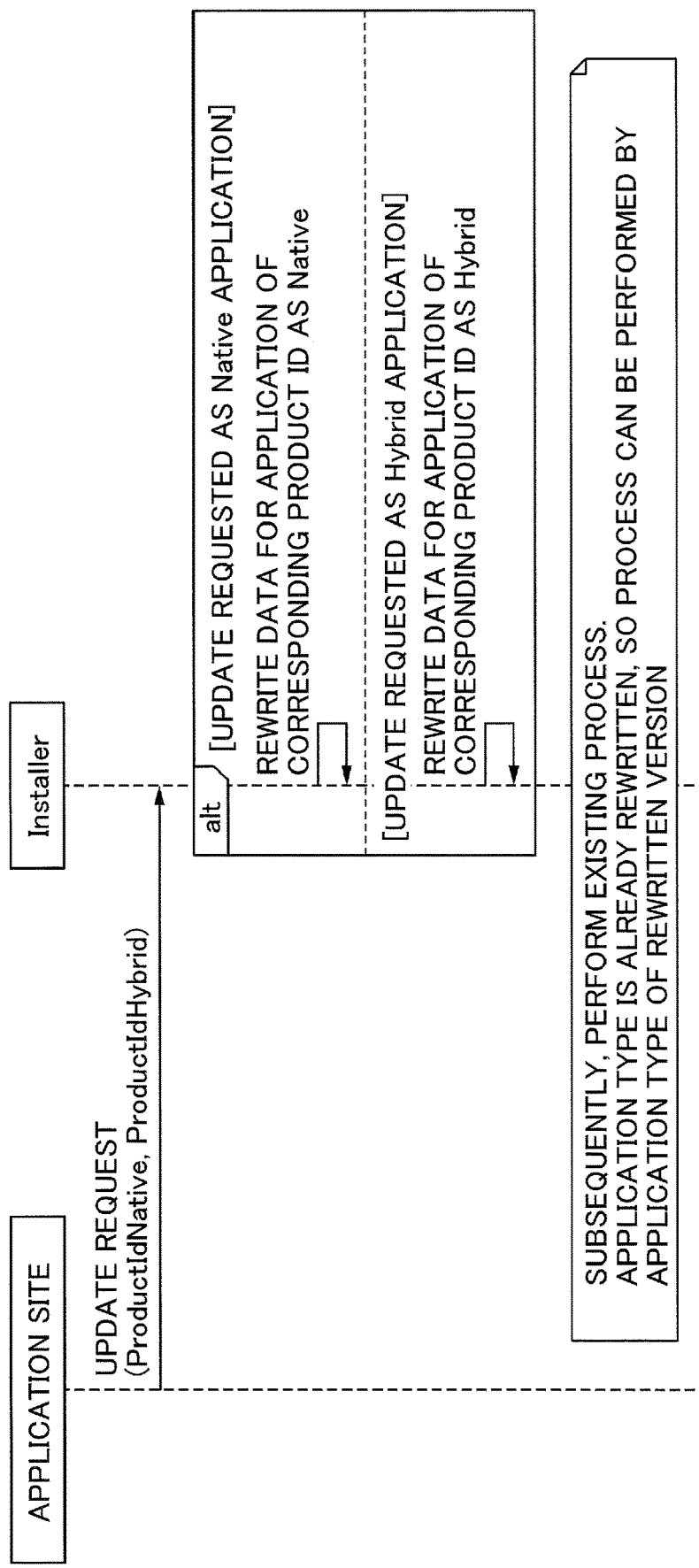
FIG. 9 is a diagram for explaining an application update according to an embodiment of the present invention.

FIG. 9 is a diagram for describing an update of an application according to an embodiment of the present invention. As illustrated in FIG. 9, at the time of the update (when updating an application), the application site (a web site or application that is capable of downloading an application to the MFP and install or update the downloaded application; the above-described application store) reports, to the MFP 1 installer (the installer unit 125 illustrated in FIG. 4), the product ID (identifier for identifying the application) and the application type (information on whether the application is a hybrid application or a native application). The installer of the MFP 1 stores the application type of the application as a hybrid application or a native application based on a report from the application site. Thereafter, the installer of the MFP 1 performs the update process according to the application type.

Figure 10:
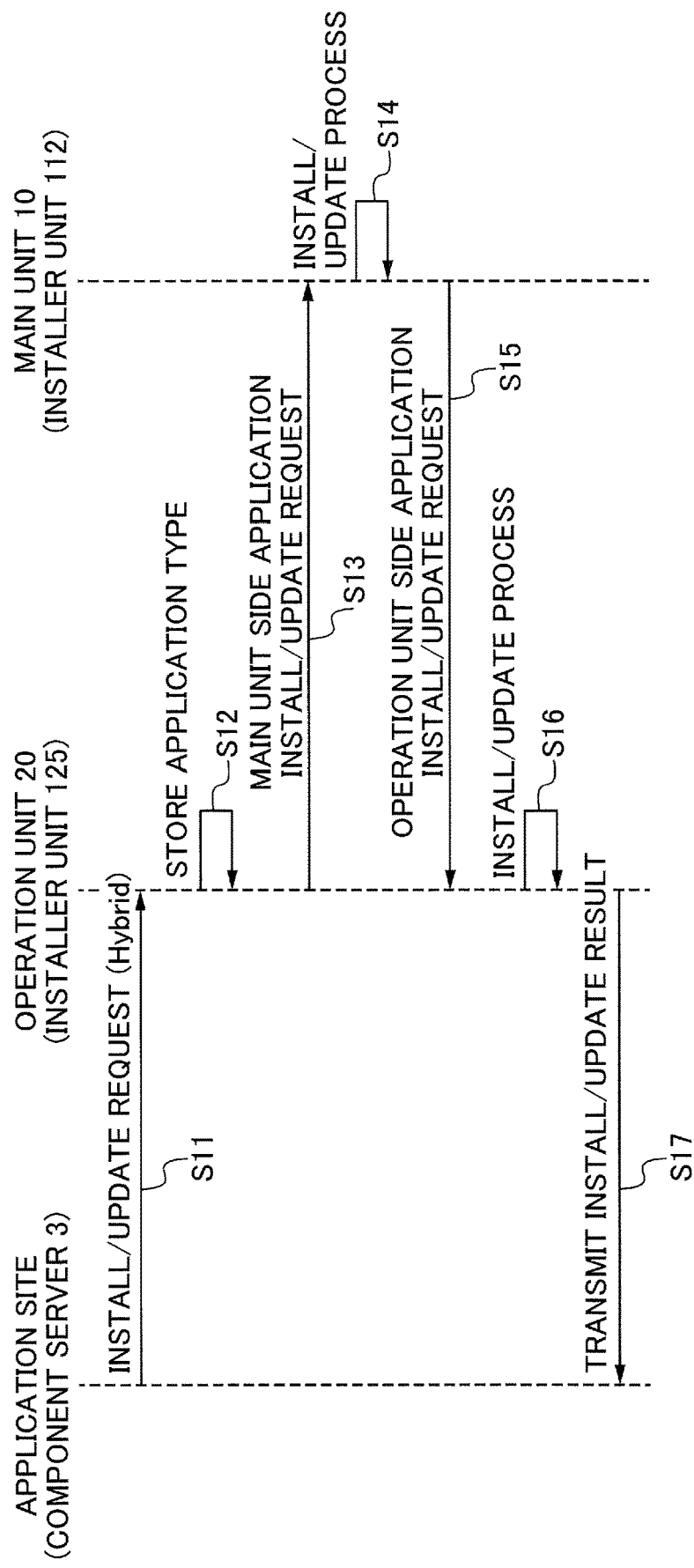
FIG. 10 is a sequence diagram illustrating an example of a process for installing and updating an application according to an embodiment of the present invention.

FIG. 10 is a sequence diagram illustrating an example of a process for installing or updating of an application according to an embodiment of the present invention.

In step S11, the application site (the component server 3) requests the installer unit 125 of the operation unit 20 to install or update an application. Specifically, the component server 3 reports the product ID (identifier for identifying the application) and the application type (information of whether the application is a hybrid application or a native application). In the example illustrated in FIG. 10, the application type is a hybrid application.

In step S12, the installer unit 125 of the operating unit 20 stores the application type acquired in step S11.

In step S13, the installer unit 125 of the operation unit 20 requests the installer unit 112 of the main unit 10 to install or update the application for which the request for installing or updating has been made in step S11.

In step S14, the installer unit 112 of the main unit 10 performs the process of installing or updating the application requested in step S13.

In step S15, the installer unit 112 of the main unit 10 requests the installer unit 125 of the operating unit 20 to install or update the application for which the request for installing or updating has been made in step S11.

In step S16, the installer unit 125 of the operation unit 20 performs the process of installing or updating the application requested in step S15.

In step S17, the installer unit 125 of the operation unit 20 transmits the result of the process of installing or updating the application to the component server 3.

As described above, in one embodiment of the present invention, the information processing apparatus such as the MFP 1 is capable of acquiring the application type of an application not only when the application is installed but also when the application is updated. Therefore, when the application type is a hybrid application, the information processing apparatus such as the MFP 1 is capable of updating both the application of the main unit and the application of the operation unit.

Hereinafter, the application store server 2, the component server 3, and the download server 4 that provide the application site will be described.

Application Store Server

Figure 11:
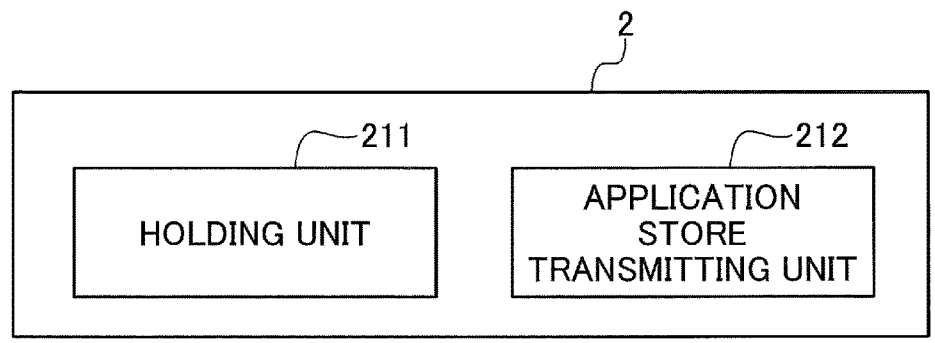
FIG. 11 is a block diagram illustrating an example of a functional configuration of an application store server according to an embodiment of the present invention.

FIG. 11 is a block diagram illustrating an example of a functional configuration of the application store server 2 according to an embodiment of the present invention. As illustrated in FIG. 11, the application store server 2 includes a holding unit 211 and an application store transmitting unit 212. For convenience of illustration, FIG. 11 mainly illustrates the functions according to the present invention, but the functions of the application store server 2 are not limited thereto.

The holding unit 211 holds the aforementioned application store. When the application store transmitting unit 212 receives the above-described application store request from the MFP 1, the application store transmitting unit 212 transmits the application store held in the holding unit 211 to the MFP 1 as a response.

Component Server

Figure 12:
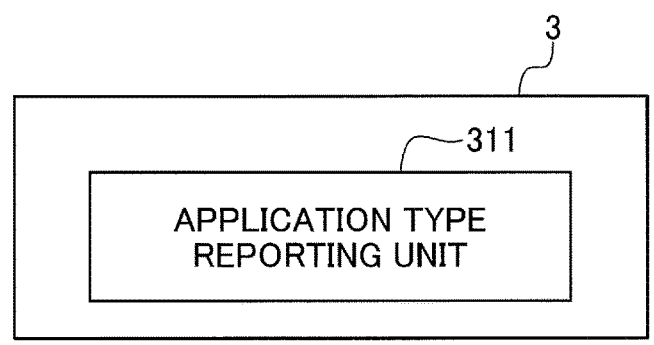
FIG. 12 is a block diagram illustrating an example of a functional configuration of a component server according to an embodiment of the present invention.

FIG. 12 is a block diagram illustrating an example of a functional configuration of the component server 3 according to an embodiment of the present invention. As illustrated in FIG. 12, the component server 3 includes an application type reporting unit 311. For convenience of illustration, FIG. 12 mainly illustrates the functions according to the present invention, but the functions of the component server 3 are not limited thereto.

When performing control to download the application to the MFP 1 and to install or update the application, the application type reporting unit 311 reports, to the installer unit 125 of the operation unit 20, the product ID (an identifier for identifying the application) and the application type (information on whether the application is a hybrid application or a native application).

Download Server

Figure 13:
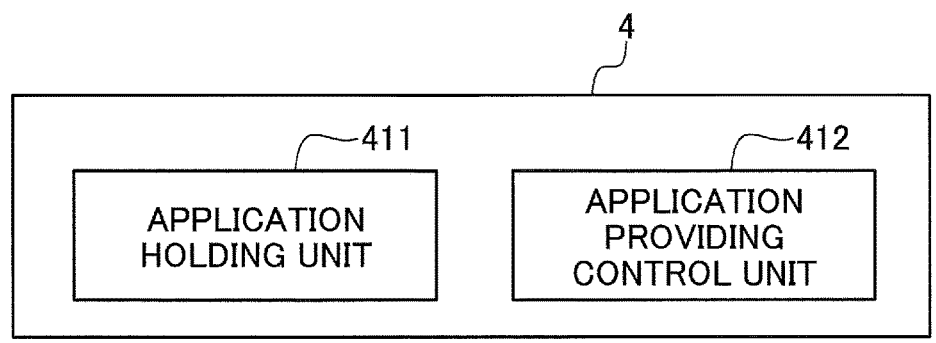
FIG. 13 is a block diagram illustrating an example of a functional configuration of a download server according to an embodiment of the present invention.

FIG. 13 is a block diagram illustrating an example of a functional configuration of the download server 4 according to an embodiment of the present invention. As illustrated in FIG. 13, the download server 4 includes an application holding unit 411 and an application providing control unit 412. The functions of the download server 4 are not limited thereto.

The application holding unit 411 holds the application displayed by the above-described application store. The application providing control unit 412 performs control for providing the application held in the application holding unit 411 to the MFP 1. In this example, the application providing control unit 412 performs control for downloading the application held in the application holding unit 411 to the MFP 1 in response to a request from the MFP 1, but is not limited thereto.

Thus, in one embodiment of the present invention, a hybrid application already installed in the information processing apparatus (e.g., installed at the time of shipment) can be easily updated from the application site.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, it is possible to update, from an application site, a hybrid application that has been installed from a location other than the application site.

The information processing apparatus, the method, and the recording medium are not limited to the specific embodiments described in the detailed description, and variations and modifications may be made without departing from the spirit and scope of the present invention.

What is claimed is:

1. An information processing apparatus comprising: a main unit including a first installer, and first processing circuitry; an operation unit including a second installer and second processing circuitry; and a memory storing computer-executable instructions that cause: the second processing circuitry to receive an application installation or update request, the application installation or update request including application identification information that identifies an application; and application type information that indicates whether the application is a cooperative application in which the application includes a first application part in the main unit that operates in cooperation with a second application part in the operation unit, store the application type information included in the application update request, and request the first installer of the main unit to install or update the first application part in the main unit corresponding to the application identification information in response to receiving the application installation or update request in a case where the stored application type information indicates the application is the cooperative application; and the first processing circuitry to request the second installer of the operation unit to install or update the second application part in the operation unit corresponding to the application identification information after the first application part in the main unit is installed or updated in the case where the stored application type information indicates the application is the cooperative application.

2. The information processing apparatus according to claim 1, wherein in a case where the stored application type information included in the application installation or update request indicates the application is an independent application in which the application operates independently in the operation unit, the computer-executable instructions cause the second processing circuitry to cause the second installer to install or update the independent application in the operation unit.

3. A method executed by an information processing apparatus including a main unit having first processing circuitry and an operation unit having second processing circuitry, the method comprising: receiving, by the second processing circuitry, an application installation or update request, the application installation or update request including application identification information that identifies an application, and application type information that indicates whether the application is a cooperative application in which the application includes a first application part in the main unit that operates in cooperation with a second application part in the operation unit; storing the application type information included in the application update request; requesting, by the second processing circuitry, the first processing circuitry of the main unit to install or update the first application part in the main unit corresponding to the application identification information, in response to receiving the application installation or update request in a case where the stored application type information indicates the application is the cooperative application; and requesting, by the first processing circuitry, the second processing circuitry of the operation unit to install or update the second application part in the operation unit corresponding to the application identification information after the first application part in the main unit is installed or updated in the case where the stored application type information indicates the application is the cooperative application.

4. A non-transitory computer-readable recording medium storing a program that causes an information processing apparatus including a main unit and the operation unit, wherein the main unit includes first processing circuitry and the operation unit includes second processing circuitry, the process comprising: receiving, by the second processing circuitry, an application installation or update request, the application installation or update request including application identification information that identifies an application, and application type information that indicates whether the application is a cooperative application in which the application includes a first application part in the main unit that operates in cooperation with a second application part in the operation unit; storing the application type information included in the application update request; requesting, by the second processing circuitry, the first processing circuitry of the main unit to install or update the first application part in the main unit corresponding to the application identification information, in response to receiving the application installation or update request in a case where the stored application type information indicates the application is the cooperative application; and requesting, by the first processing circuitry, the second processing circuitry of the operation unit to install or update the second application part in the operation unit corresponding to the application identification information after the first application part in the main unit is installed or updated in the case where the stored application type information indicates the application is the cooperative application.

* * * * *